United States Patent [19]

McPherson et al.

[11] Patent Number: 5,366,257
[45] Date of Patent: Nov. 22, 1994

[54] PIPE CONNECTOR

[75] Inventors: Terry R. McPherson; Paul A. Spirkowyc; Daniel W. Womeldorff, all of Charlotte, N.C.

[73] Assignee: Eslon Thermoplastics, a Division of Sekisui America Corporation, Charlotte, N.C.

[21] Appl. No.: 998,392

[22] Filed: Dec. 30, 1992

[51] Int. Cl.⁵ ............................................. F16L 55/00
[52] U.S. Cl. ..................... 285/174; 285/330; 285/392; 285/423; 285/328; 285/908
[58] Field of Search ............... 285/229, 423, 174, 328, 285/908, 355, 330, 392

[56] References Cited

U.S. PATENT DOCUMENTS

| | | | |
|---|---|---|---|
| 4,093,280 | 6/1978 | Yoshizawa et al. | 285/174 X |
| 4,313,286 | 2/1982 | Harbeke | 285/174 X |
| 4,428,602 | 1/1984 | Lambot et al. | 285/174 X |
| 4,631,212 | 12/1986 | Shifflett et al. | 285/174 X |
| 4,919,461 | 4/1990 | Reynolds | 285/174 |
| 5,109,929 | 5/1992 | Spears | 285/174 X |

FOREIGN PATENT DOCUMENTS

| | | | |
|---|---|---|---|
| 485706 | 5/1992 | European Pat. Off. | 285/423 |
| 1162405 | 9/1958 | France | 285/908 |

Primary Examiner—Dave W. Arola
Attorney, Agent, or Firm—Ralph H. Dougherty

[57] ABSTRACT

An improved connecting device for of securing a pipe fitting of one material to a pipe of another. This invention provides a connector body with an insert fitting which does not leak therebetween. Further, the invented device has an integral annular flange, which extends into the surrounding body thereby preventing the body from expanding with heat and slipping with relation to the insert upon engaging the fitting with a nipple or other pipe material, and twisting forcefully.

12 Claims, 3 Drawing Sheets

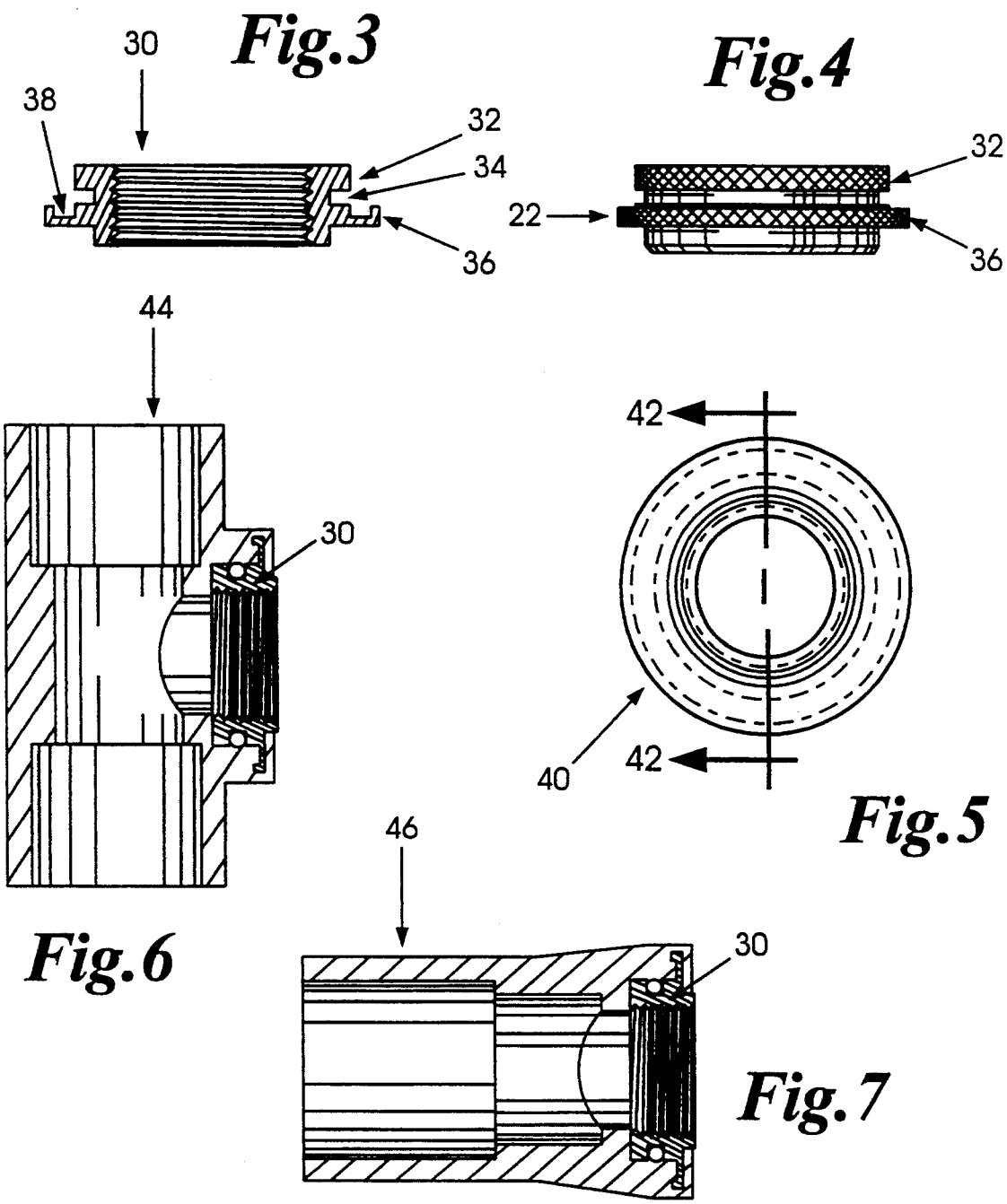

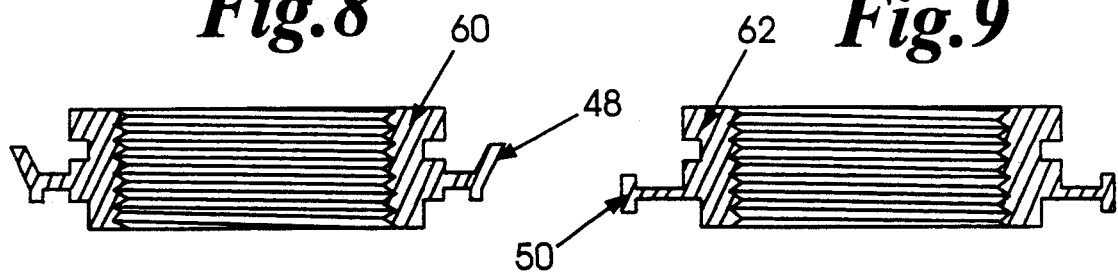
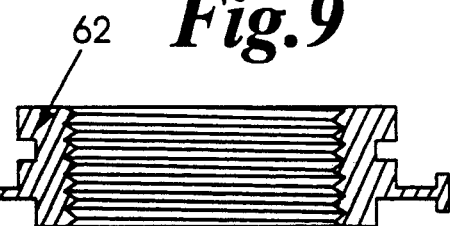
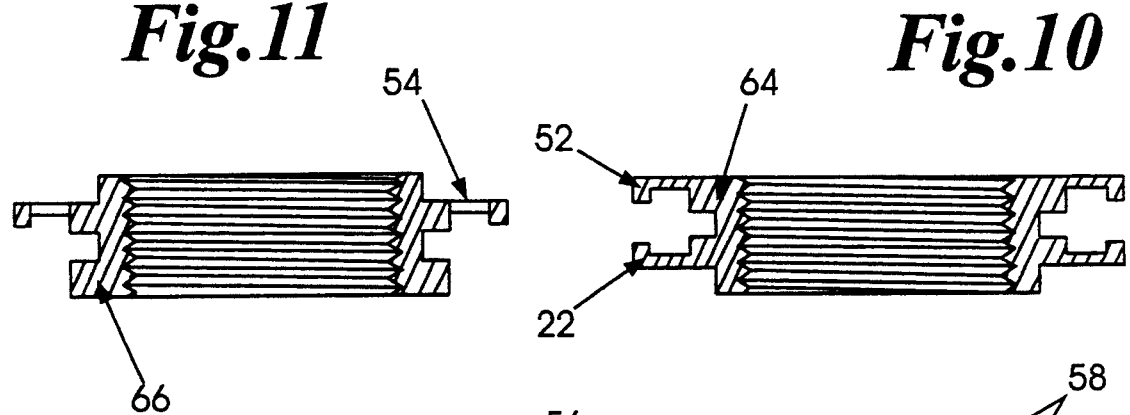
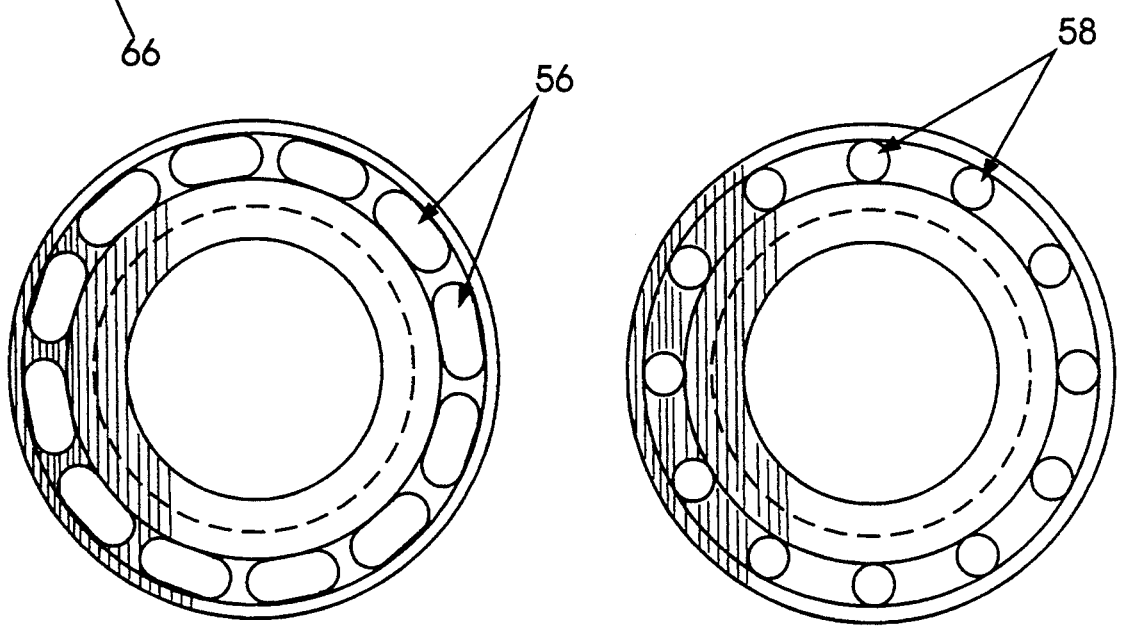
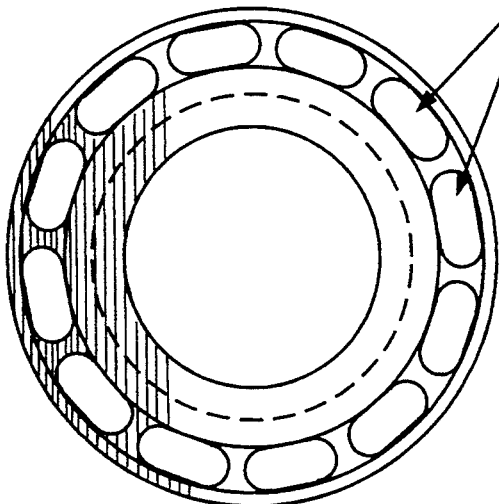
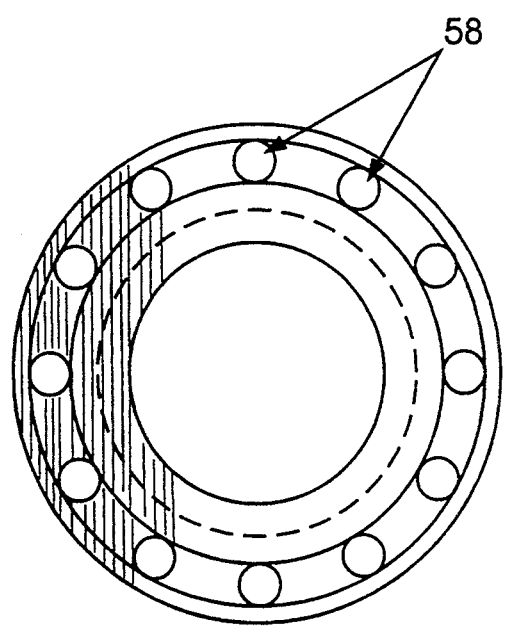

PIPE CONNECTOR

FIELD OF THE INVENTION

The present invention relates to a method and apparatus for providing a leak free connection between a threaded metal element and a plastic pipe in a high pressure system, and more particularly to a pipe connector device and method for production of such device.

BACKGROUND OF THE INVENTION

Metal piping is preferred in high pressure systems. The problem with metal piping is that it is prone to rust or corrode. Therefore today high pressure systems are increasingly being made out of plastic. The plastic pipes are do not corrode and the reduced weight of the plastic piping facilitates installation. However connections between plastic pipes, especially where they are attached to metal piping as proven problematic. Failures often occur at threaded connections between metal and plastic pieces. One reason for this is that threaded plastic cannot take high torques or stresses. Plastic adapter threads are prone to attack by solvent adhesives used to secure plastic and metal parts together. During installation cracks in plastic couplings often occur from overtightening.

DESCRIPTION OF THE PRIOR ART

Applicants are aware of the following U.S. patents concerning connectors made from different materials and more particularly connections between a threaded metal element and a plastic pipe.

| U.S. Pat. No. | Issue Date | Inventor | Title |
|---|---|---|---|
| 205,709 | 07-02-1878 | Wells | COUPLING FOR THE JOINTS OF LOGS |
| 583,667 | 06-01-1897 | Austin | FLEXIBLE COUPLING FOR CONDUITS |
| 567,962 | 09-22-1896 | Cooper | HOSE MENDER |
| 614,464 | 11-22-1898 | Gustafson | BRONZE JOINT RING IN COMBINATION WITH IRON OR STEEL |
| 1,151,300 | 08-24-1915 | Soresi | INSTRUMENT FOR THE TRANSFUSION OF BLOOD |
| 1,996,855 | 10-24-1933 | Cheswright | HOSE PIPE NIPPLE OR CONNECTOR |
| 2,091,085 | 05-06-1936 | Scholtes | HIGH PRESSURE HOSE COUPLING |
| 2,119,645 | 06-29-1936 | Pearson | FOUNTAIN PEN |
| 2,315,225 | 11-08-1941 | Rogers | HOSE COUPLING |
| 3,759,445 | 09-18-1973 | King | FLEXIBLE FITTING FOR LAWN SPRINKLER SYSTEMS |
| 4,679,405 | 07-14-1987 | Mitchell | MOLDED DRAIN CONNECTION WITH INSERT |
| 4,712,809 | 12-15-1987 | Legris | METHOD AND DEVICE FOR ASSEMBLING SEVERAL COMPONENTS, PARTICULARLY CONNECTION FITTINGS FOR FLUID COUPLINGS |
| 4,9005,766 | 03-06-1990 | Dietz | ADAPTER FOR PLASTIC PIPE |
| 5,109,929 | 05-05-1992 | Spears | SPRINKLER HEAD ADAPTER |

Wells U.S. Pat. No. 205,709 teaches in FIG. 1 a flange with rearwardly projecting sharp edged lips which are used to connect hollow logs and lock them together.

Austin U.S. Pat. No. 583,667 teaches a conduit or coupling for connecting a supply pipe or fitting, such as an air delivering pipe connected with an air pump, with a receiving pipe or fitting, such as the valve-casing of a bicycle tire, the coupling forming a section of the conduit of which the supply and receiving fittings form other sections.

Cooper U.S. Pat. No. 567,962 teaches an insert for repairing a garden hose which has both a beveled flange and hose-retaining spurs projecting upward from it.

Gustafson U.S. Pat. No. 614,464 teaches the application of a bronze or copper joint-ring in combination with iron or steel to form a composite casting.

Soresi U.S. Pat. No. 1,151,300 teaches a device which has "outwardly-extending, rearwardly-curved hooks" constructed and located to securely retain a blood-carrying vein or artery.

Cheswright U.S. Pat. No. 1,966,855 teaches a nipple device with multiple annular teeth designed to hold a hose securely in place.

Scholtes U.S. Pat. No. 2,091,085 teaches a coupling for a hose or tube that has a "backwardly-extending" bulge.

Pearson U.S. Pat. No. 2,119,645 teaches fountain pen apparatus which provides improved means for securing the ink-sack to the so-called "section" which holds the pen point. The apparatus also secures the "section" in the barrel.

Rogers U.S. Pat. No. 2,315,225 teaches apparatus for hose lines and flexible conduits which provide an improved construction of the coupling whereby hose sections may be quickly and efficiently interconnected.

King U.S. Pat. No. 3,759,445 teaches a flexible fitting for lawn sprinklers. The fitting provides a flexible connection between the sprinkler and the pipeline which is capable of yielding to prevent damage and injury in event the sprinkler or sprinkler riser is accidentally struck.

Mitchell U.S. Pat. No. 4,679,405 teaches a metal interiorly threaded insert embedded in a plastic conduit. Mitchell however, includes limiting language which limits the securing means to a discharge conduit to prevent rotation, and an axial opening in an associated pan.

Legris U.S. Pat. No. 4,712,809 teaches a method of making fluid couplings from different materials, in which the major members swivel relative to one another.

Dietz U.S. Pat. No. 4,905,766 teaches an internally threaded metal element in a non-metallic pipe, however the patent includes limiting language which clearly distinguishes the invented fitting.

Spears U.S. Pat. No. 5,109,929 teaches a sprinkler head adapter comprising an internally threaded plastic fitting, a metal insert with both internal and external threads, and a sealing gasket.

SUMMARY OF THE INVENTION

The invented device is a connector apparatus for piping having a body of a castable first material, preferably plastic, provided with an insert fitting of a second material, preferably metal or metal alloy. The insert fitting is provided with an annular channel generally central from the top and bottom of the insert, which receives an O-ring. The insert has an integral annular flange which extends into the body of the connector.

During normal operation, the integral annular flange of the insert prevents the plastic material of the connector body from expanding with heat and slipping relative to the insert upon engaging the fitting or connector with a nipple or other pipe material, and twisting forcefully.

The present invention is particularly useful for applications where connectors and parts should be made from different materials.

OBJECTS OF THE INVENTION

The principal object of the invention is to provide an improved method and apparatus for securing a pipe of one material to a pipe of another material.

A further object of this invention is to provide a pipe connector with an insert fitting which is not subject to leaking.

Another object of the invention is to provide a pipe connector apparatus for connecting piping of dissimilar materials.

Another object of the invention is to provide a pipe connector having a plastic body which is tightly held into position relative to an insert fitting to prevent the plastic from expanding with heat and slipping with relation to the metal insert upon engaging the fitting with a nipple or other pipe material or connector, and twisting forcefully.

BRIEF DESCRIPTION OF THE DRAWINGS

The foregoing and other objects will become more readily apparent by referring to the following detailed description and the appended drawings in which:

FIG. 3 is a cross sectional view of an insert fitting.

FIG. 4 is a side view of the insert fitting.

FIG. 5 is a bottom view of the insert fitting.

FIG. 6 is a cross sectional view of a T-pipe adaptor made from a first material with an insert fitting made from a second material.

FIG. 7 is a cross sectional view of a straight pipe made from a first material with an insert fitting made from a second material.

FIG. 8 is a cross sectional view of an alternative insert fitting.

FIG. 9 is a cross sectional view of an alternative insert fitting.

FIG. 10 is a cross sectional view of an alternative insert fitting.

FIG. 11 is a cross sectional view of an alternative insert fitting.

FIG. 12 is a top view of an alternative insert fitting showing elongated apertures in the annular flange.

FIG. 13 is a top view of an alternative insert fitting showing round apertures in the annular flange.

DETAILED DESCRIPTION

Figure 1:
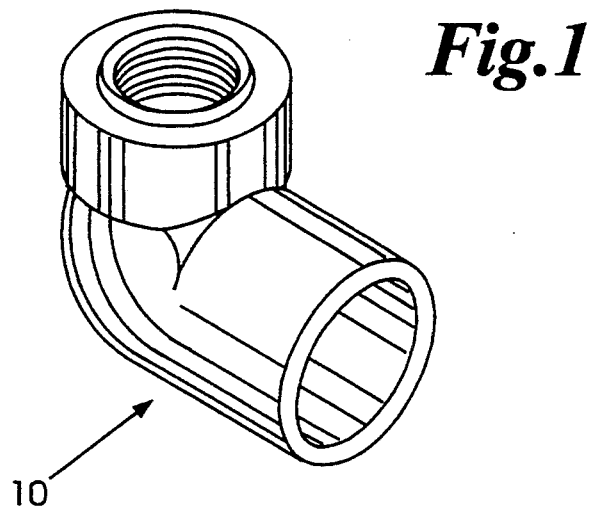
FIG. 1 is an isometric view of a pipe connector according to the present invention.
Figure 2:
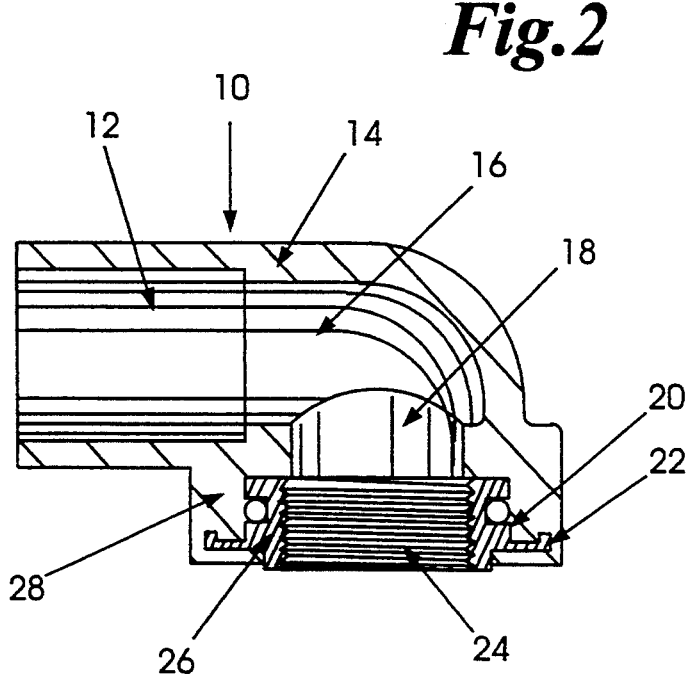
FIG. 2 is a cross sectional view of the pipe connector of FIG. 1 made from a first material with an insert fitting made from a second material.

Referring now to the drawings, and particularly to FIGS. 1 and 2, piping of one material 28 is provided with an insert fitting of a second material 26 to form an integral connector unit 10. Insert fitting 30, shown in FIG. 3, is provided with a channel 34 central from the top and bottom of the insert 30, which accepts an O-ring of a third material 20. The integral annular flange 22 is configured in the insert which extends into the first material of the piping 28. Both the exterior of the integral annular flange 36 and the body of the insert fitting 32 are provided with a knurled surface, FIG. 4, which facilitates a secure bonding with the material of the piping 28. Preferably, the connector body is plastic and the insert fitting is metal or metal alloy.

The connector body can be made of a variety of materials, including but not limited to any plastic material with sufficient desired strength, elongation and other mechanical and physical properties, including castability. Suitable plastic materials for the piping 28 include polypropylene, (PP), polyethylene (PE), polyvinyl chloride (PVC), chlorinated polyvinyl chloride (CPVC), polyvinylidene fluoride (PVDF), ultra high molecular weight polyethylene (UHMWPE), ethylene chlorotrifluoroethylene (ECTFE), ethylene tetrafluoroethylene (ETFE), chlorotrifluoroethylene (CTFE), fluorinated ethylene propylene (FEP), perfluoroalkoxy (PFA), acrylonitrile-butadiene-styrene (ABS), fiberglass reinforced plastic (FRP), fiberglass reinforced vinyl ester, fiberglass reinforced epoxy, polyphenylene sulfide (PPS), polyphthalamide (PPA), fiberglass reinforced polyvinylchloride, fiberglass reinforced polyester, polyether ether ketone (PEEK), polysulfone, or any thermoplastic or thermosetting plastic material or composite. Alternatively, the connector body can be a castable ceramic material.

The insert 30 can be made of a variety of metals or alloys, including, but not limited to brass, bronze, copper, aluminum, steel, stainless steel, HASTELLOY TM, INCONEL TM, or MONEL TM.

The sealing device or O-ring 20 can be made of rubber or a soft plastic such as an elastomer. Suitable materials for the sealing device include but are not limited to rubber, Buna-N rubber, neoprene, VITON TM, SANIPRENE TM, or a soft plastic such as an elastomer, polytetrafluorethylene (PTFE), nitrile rubber (NBR), ethylene propylene rubber (EPDM), butyl rubber, chloroprene rubber (CR), fluorine rubber (FPM), chlorine sulphonyl polyethylene (CSM), per fluoro (ethylene-propylene) copolymer (FEP), and ethylene/chlorotrifluoroethylene copolymer (ECTFE).

ALTERNATIVE EMBODIMENTS

While the sealing device or O-ring 20 can be made of rubber or a soft plastic such as an elastomer, there my be applications where a TEFLON TM sealing device is preferable. TEFLON TM is a Fluorocarbon resin available from E. I. Du Pont de Nemours, & Co.

The purpose of the annular flange 22 on the insert fitting is to lock the insert 30 into the surrounding tubing 28. Therefore it is possible to configure the annular flange with a lip above and below the flange 50 as shown in FIG. 9. The lip on the annular flange 50 of the insert fitting 62 can be parallel to the insert fitting 62, or at an angle from the insert fitting 60 as shown in 48 of FIG. 8. For additional rigidity a second annular flange 52 can be added to the insert fitting 64 as shown in FIG. 10.

While the annular flange 22 is solid, as shown in FIG. 5, to facilitate bonding between the annular flange 22 and the material of the piping 28, the annular flange can be configured with apertures 56 and 58 as shown in FIGS. 12 and 13 respectively. Configuring annular flange 22 with apertures, 56 or 58, allows the material of the piping 28 to flow through the apertures in manufacturing. When the material 28 hardens, the insert fitting 30 is locked securely in place.

Figure 14:
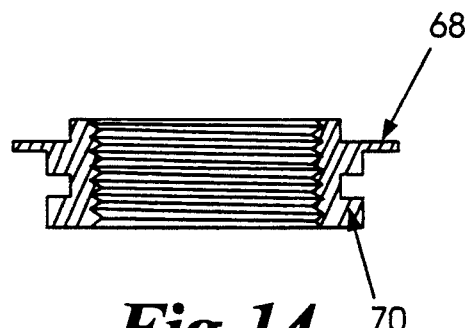
FIG. 14 is a cross sectional view of an alternative insert fitting.

The annular flange may have a lip as shown in 22 or no lip at all as shown in 68 of FIG. 14. The exterior of the flange may have a diamond shaped knurl as shown in 36, FIG. 4, or be either textured, smooth or provided with apertures. Texturing may be accomplished by knurling.

While the pipe adapter 10 in FIG. 1 shows a 90° elbow joint a variety of pipe configurations can be made with this insert fitting. Examples of different configurations are a T-adapter 44 shown in FIG. 6 and a straight adapter 46 shown in FIG. 7. These examples are for illustrative purposes only. Additional pipe configurations may be made by those skilled in the art, without departing from the spirit and scope of this invention.

SUMMARY OF THE ACHIEVEMENT OF THE OBJECTS OF THE INVENTION

From the foregoing, it is readily apparent that we have invented an improved method and apparatus of securing a fitting of one material into a connector body of another. This invention provides connector apparatus for piping with an insert fitting which does not leak. Further, the invented apparatus includes an integral annular flange on the metal insert, which extends downwardly into the plastic surroundings thereby preventing the plastic from expanding with heat and slipping with relation to the metal insert upon engaging the fitting with a nipple or other pipe material or connector, and twisting forcefully.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An internally threaded, fluid-tight tubular connector device, comprising:
   a tubular body of a plastic material;
   an annular insert situated within said body of said plastic material, said insert being made of a second material dissimilar to that of said tubular body:
   said insert having an internal thread;
   said insert having a thin annular flange means extending a substantial distance radially outward from the outer circumferential surface of said insert for locking said insert into the material of said tubular body;
   a measurable difference between the outer circumference of said annular flange means and said outer circumferential surface of said insert being substantially greater than the thickness of said annular flange means;
   said annular flange means providing at least one surface normal to said outer circumferential surface of said annular insert;
   said insert having an annular recess in said outer circumferential surface and a sealing O-ring positioned in said recess.

2. A connector device according to claim 1 where said plastic material is selected from the group consisting of: polypropylene, (PP), polyethylene (PE), polyvinyl chloride (PVC), chlorinated polyvinyl chloride (CPVC), polyvinylidene fluoride (PVDF), ultra high molecular weight polyethylene (UHMW PE), ethylene chlorotrifluoroethylene (ECTFE), ethylene tetrafluoroethylene (ETFE), chlorotrifluoroethylene (CTFE), fluorinated ethylene propylene (FEP), perfluoroalkoxy (PFA), acrylonitrile-butadiene-styrene (ABS), fiberglass reinforced plastic (FRP), fiberglass reinforced vinyl ester, fiberglass reinforced epoxy, polyphenylene sulfide (PPS), polyphthalamide (PPA), fiberglass reinforced polyvinylchloride, fiberglass reinforced polyester, polyether ether ketone (PEEK), or polysulfone.

3. A connector device according to claim 1 where said second material is selected from the group consisting of: brass, bronze, copper, aluminum, steel, stainless steel, HASTELLOY TM, INCONEL TM, or MONEL TM.

4. A connector device according to claim 1 where said O-ring is made of a material selected from the group consisting of: rubber, Buna-N rubber, neoprene, VITON TM, SANIPRENE TM, TEFLON TM, a soft plastic such as an elastomer, polytetrafluorethylene (PTFE), nitrile rubber (NBR), ethylene propylene rubber (EPDM), butyl rubber, chloroprene rubber (CR), fluorine rubber (FPM), chlorine sulphonyl polyethylene (CSM), per fluoro (ethylenepropylene) copolymer (FEP), and ethylene/chlorotrifluoroethylene copolymer (ECTFE).

5. A connector device according to claim 1 where said internal thread is tapered.

6. A connector device according to claim 1 where at least part of said the external circumferential surface of said insert is textured.

7. A connector device according to claim 1 where said annular flange means extends outward from said insert then parallel to the central axis of said insert.

8. A connector device according to claim 1 where said annular flange means extends outward from said insert, then parallel to said outer circumference of said tubular plastic body in both directions, whereby said annular flange means has a T configuration.

9. A connector device according to claim 1 where said annular flange means is provided with apertures at evenly spaced intervals.

10. A connector device according to claim 1 where the outer circumferential surface of said annular flange means is provided with a lip at an angle therefrom.

11. A connector device according to claim 1 where at least part of the external circumferential surface of said annular flange means is textured.

12. An internally threaded, fluid-tight tubular connector device, comprising:
   a tubular body of a castable material selected from the group consisting of ceramics, thermoset plastics, and thermoplastics;
   an annular insert situated within said body of said castable material, said insert being made of a second material different from that of said tubular body;

said insert having an internal thread;

said insert having a thin annular flange means extending a substantial distance radially outward from the outer circumferential surface of said insert for locking said insert into the material of said tubular body;

said annular flange means having a width less than its length;

said annular flange means providing at least one surface normal to outer circumferential surface of said insert;

said insert having an annular recess in said outer circumferential surface and a sealing O-ring positioned in said recess.

* * * * *